(12) United States Patent
Ayaki et al.

(10) Patent No.: US 8,341,701 B2
(45) Date of Patent: Dec. 25, 2012

(54) COMMUNICATION APPARATUS

(75) Inventors: Yasushi Ayaki, Osaka (JP); Hiroyuki Iitsuka, Osaka (JP); Naoshi Usuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 639 days.

(21) Appl. No.: 11/662,078

(22) PCT Filed: Sep. 6, 2005

(86) PCT No.: PCT/JP2005/016335
§ 371 (c)(1),
(2), (4) Date: Mar. 7, 2007

(87) PCT Pub. No.: WO2006/028094
PCT Pub. Date: Mar. 16, 2006

(65) Prior Publication Data
US 2008/0072046 A1 Mar. 20, 2008

(30) Foreign Application Priority Data
Sep. 7, 2004 (JP) .................................. 2004-259213

(51) Int. Cl.
*G06F 7/04* (2006.01)
(52) U.S. Cl. ......... 726/3; 726/4; 726/5; 726/6; 713/168; 713/171; 713/178; 713/182
(58) Field of Classification Search .................. 726/3, 4, 726/5, 6; 713/168, 171, 178
See application file for complete search history.

(56) References Cited

U.S. PATENT DOCUMENTS 7,529,935 B2 * 5/2009 Saito et al. .................... 713/168
(Continued)

FOREIGN PATENT DOCUMENTS

EP 1 496 660 A2 1/2005
(Continued)

OTHER PUBLICATIONS

International Preliminary Report on Patentability and Written Opinion of the International Searching Authority, issued in corresponding International Patent Application No. PCT/JP2005/016335, dated Sep. 6, 2005.

(Continued)

*Primary Examiner* — Jeffrey D Popham
*Assistant Examiner* — Gary Gracia
(74) *Attorney, Agent, or Firm* — McDermott Will & Emery LLP

(57) ABSTRACT

The conventional data transmitting/receiving system has problems: that a correct measurement cannot be performed because a measurement result is an addition of a verification processing time and a transmission time; that an authentication processing which is necessary for a transmission time measurement processing needs to be separately required; and that an unnecessary key exchange processing is executed.

The transmission apparatus (a) shares authentication information with a request source which requests for transmission of content data, (b) transmits, to the request source, a measurement request generated using the authentication information, (c) receives, from the request source, a measurement response generated using the authentication information by the request source, as a response to the measurement request, (d) measures the period of time from the transmission of the measurement request to the reception of the measurement response, as a round trip time, (e) transmits, to the request source, a measurement preparation request for a preparation which is necessary for generating the measurement response, before the transmission of the measurement request, and (f) determines that the request source is an eligible device as the transmission destination of the content data, after the measurement of the round trip time, in the case where it is confirmed that the round trip time is less than or equal to a reference value, the measurement response is verified as a correct response, and the measurement request is verified as a correct request by the request source.

30 Claims, 11 Drawing Sheets

U.S. PATENT DOCUMENTS

| | | | |
|---|---|---|---|
| 7,535,852 B2 * | 5/2009 | Matsushita et al. | 370/252 |
| 7,565,698 B2 * | 7/2009 | Isozaki et al. | 726/26 |
| 7,584,294 B2 * | 9/2009 | Plamondon | 709/233 |
| 2002/0154600 A1 * | 10/2002 | Ido et al. | 370/216 |
| 2003/0061304 A1 * | 3/2003 | Tenereillo et al. | 709/217 |
| 2003/0061518 A1 * | 3/2003 | Yamaguchi et al. | 713/201 |
| 2004/0103303 A1 * | 5/2004 | Yamauchi et al. | 713/200 |
| 2004/0107252 A1 * | 6/2004 | Futa et al. | 709/204 |
| 2004/0158634 A1 * | 8/2004 | Saito et al. | 709/225 |
| 2004/0193881 A1 * | 9/2004 | Ayaki et al. | 713/168 |
| 2005/0027851 A1 * | 2/2005 | McKeown et al. | 709/224 |
| 2005/0027984 A1 * | 2/2005 | Saito et al. | 713/168 |
| 2005/0160265 A1 * | 7/2005 | Tanaka et al. | 713/168 |
| 2005/0160274 A1 * | 7/2005 | Yukimatsu et al. | 713/182 |
| 2005/0210290 A1 * | 9/2005 | Ono et al. | 713/201 |
| 2005/0255865 A1 * | 11/2005 | Sillasto et al. | 455/456.5 |
| 2006/0112272 A1 | 5/2006 | Morioka et al. | |

FOREIGN PATENT DOCUMENTS

| | | |
|---|---|---|
| JP | 5-284499 | 10/1993 |
| JP | 6-77953 | 3/1994 |
| JP | 2001-285283 | 10/2001 |
| JP | 2001-352579 | 12/2001 |
| JP | 2002-108819 | 4/2002 |
| JP | 2004-104295 | 4/2004 |
| JP | 2004-194295 | 7/2004 |
| JP | 2005-45756 | 2/2005 |
| WO | WO 2004/036840 A1 | 4/2004 |

OTHER PUBLICATIONS

"DRM Dai 2 Bu Network o Zentei ni Secure no Wa o Hirogeru [Expanding Security in Networks]", Nikkei Electronics, May 10, 2004, pp. 88-95, No. 873, CS-ND-2004-01642-003.

* cited by examiner

COMMUNICATION APPARATUS

RELATED APPLICATIONS

This application is the U.S. National Phase under 35 U.S.C. §371 of International Application No. PCT/JP2005/016335, filed on Sep. 6, 2005, which in turn claims the benefit of Japanese Application No. 2004-259213, filed on Sep. 7, 2004, the disclosures of which Applications are incorporated by reference herein.

TECHNICAL FIELD

The present invention relates to a communication apparatus which transmits or receives encrypted content data, in particular to a communication apparatus which communicates with a transmission destination or source which is restricted based on a transmission time.

BACKGROUND ART

In recent years, a home network for promoting sharing of various contents by connecting home devices through a network has been realized. As one form of implementing the home network, there is a suggested star-formed connection in which each home device such as PC and digital camera, and an AV server for storing contents are respectively connected to a router, which is placed in a home. The router connects a network in a home with a network outside the home. The AV server positioned in a home has a function of temporally storing various contents obtained from the network outside the home via the router or various contents broadcasted by means other than networks, for example, a digital broadcast, and of transmitting each content to a receiving apparatus which has requested the content according to a request from each device.

On the other hand, in the case of dealing with data requiring copyright protection such as latest movies, television programs by pay broadcast, and music, it is necessary to protect the copyrights of such data. As an effective method for protecting copyrights, there is a method of adding restrictions on data use by encrypting data which requires a copyright protection.

For example, when audio video data (hereinafter, referred to as AV data) needs to be protected for its copyrights in the case of being transmitted through a network, the AV data is encrypted and transmitted. An example of implementing this process is standardized as a Digital Transmission Protection over Internet Protocol) method.

The DTCP-IP method has functions of authentication and key revocation, and when AV data is transmitted, copyright protection is realized by encrypting data requiring the copyright protection, and transmitting the encrypted data while removing unauthorized devices.

Furthermore, the use of AV data which requires copyright protection is generally restricted to an individual use in a family so that it is necessary to restrict the AV server in a home to distribute the AV data without limitations to unspecific receiving apparatuses placed outside the home.

In the DTCP-IP method, Time to Live (TTL) is used so as to restrict an achievement range of a command to be transmitted. Note that, TTL indicates a Time to Live of a packet in an IPv4 (a value of Time to Live field), and corresponds to the number of relays (a value of Hop Limit field) in an IPv6. This indicates that the number of routers which can be passed through by an IP packet can be set based on a value set in the TTL field included in the IP packet header.

However, the TTL field of the IP packet header is not protected against manipulations. Therefore, there is a problem that the TTL field can be manipulated by a relay device.

Accordingly, there is a suggested transmitting/receiving system of measuring an RTT (Round Trip Time) which is a transmission time for a round trip between a transmitting apparatus which transmits AV data and a receiving apparatus which receives the AV data, and of allowing an authentication when it is determined that the measured RTT is shorter than a predetermined restriction time (for example, refer to Patent Reference 1).

In this data transmitting/receiving system, there is a possibility that the measured RTT is shorter than the actual time if an unauthorized device is intervened, in the case of measuring a round trip time RTT by measuring the period of time from the transmission of the measurement request to the reception of its response. Therefore, it is necessary to execute detection processing by both of the device for receiving a measurement request and the device of receiving a request response, in order to detect whether the handshaking between the measurement request and the request response is not intervened by an unauthorized device.

Hereinafter, a conventional data transmitting/receiving system is described with reference to FIG. 10 and FIG. 11.

FIG. 10 shows a flow of a process from authentication to encrypted transmission when an encrypted transmission is performed by the transmitting apparatus and the receiving apparatus.

As shown in the diagram, first, the receiving apparatus transmits an authentication request to the transmitting apparatus and starts a measurement authentication process S101. After the authentication process S101, the transmitting apparatus and the receiving apparatus execute a transmission time measurement process S102 so as to measure an RTT of the receiving apparatus. In the case where the RTT is less than or equal to a reference value, the transmitting apparatus and the receiving apparatus execute a key exchange authentication process S103, and execute a key exchange process S104 when the authentication process succeeds.

After the key exchange process, the transmitting apparatus encrypts and transmits the AV data, while the receiving apparatus generates a decryption key using an exchange key received in the key exchange process, and decrypts the received encrypted data (S105).

FIG. 11 is a flowchart showing a detailed process of the transmission time measurement process S102.

First, the transmitting apparatus generates transmitting apparatus measurement information, stores the transmitting apparatus measurement information into the measurement request, and transmits the measurement request (S111). The receiving apparatus verifies the received transmitting apparatus measurement information (S112). When the measurement information is incorrect, the receiving apparatus terminates the process as an error. When the measurement information is correct, the receiving apparatus generates receiving apparatus measurement information (S113), stores the receiving apparatus measurement information into a measurement request response, and transmits the measurement request response. The transmitting apparatus measures an RTT when receiving the measurement request response (S114).

Following that, the transmitting apparatus checks the measurement value of the RTT (S115), and when the measurement value is less than or equal to a reference value (Tmax), terminates the measurement processing, and proceeds to the next processing. When the measurement value is greater than the reference value, the transmitting apparatus checks the number of measurements (S116). When the number of measurements is not reached the predetermined number of measurements, the transmitting apparatus returns to S111, and repeats the measurement. After transmitting the measurement request response, the receiving apparatus is in a wait state for receiving the request. When receiving the measurement request, the receiving apparatus returns to S111, and repeats the measurement (S117).

Next, the transmitting apparatus verifies whether or not the receiving apparatus measurement information stored in the received measurement request response is correct (S118), and when the measurement information is incorrect, terminates the processing as an error. When the measurement information is correct, the transmitting apparatus determines that the measurement value is less than or equal to the reference value and is the correct value.

Patent Reference 1: Japanese Laid-Open Patent Application No. 2004-194295 (page 11)

DISCLOSURE OF INVENTION

Problems that Invention is to Solve

However, in the transmission time measurement processing performed in the above-identified conventional data transmitting/receiving system, the receiving apparatus detects the transmitting apparatus measurement information and transmits a measurement request response when receiving the measurement request, therefore causing a problem that an RTT cannot be measured correctly because the RTT which is measured is an addition of the verification processing time and the transmission time. Furthermore, the conventional data transmitting/receiving system has an additional authentication processing for the transmission time measurement processing. Therefore, there are problems that the processing is to be complicated and that an unnecessary key exchange processing is to be executed even when only the transmission time measurement is wished to be performed.

Accordingly, an object of the present invention is to provide a communication apparatus, a communication system, a communication method, a medium, and a program which can correctly measure a transmission time and share the authentication processing for an encrypted transmission, and does not perform unnecessary key exchange processing.

Means to Solve the Problems

In order to achieve the aforementioned object, the communication apparatus according to the present invention is (a) a communication apparatus which responds to a request for transmission of content data, the apparatus including: (a1) an authentication unit which shares authentication information with a request source which requests for the transmission of the content data; (a2) a measurement request transmitting unit which transmits, to the request source, a measurement request which is generated using the authentication information; (a3) a measurement response receiving unit which receives, from the request source, a measurement response which is generated using the authentication information by the request source, as a response to the measurement request; (a4) a round trip time measurement unit which measures the period of time from the transmission of the measurement request to the reception of the measurement response, as a round trip time; and (a5) a determination unit which determines that the request source is an eligible device as a transmission destination of the content data, after the measurement of the round trip time, in the case where it is confirmed that: the round trip time is less than or equal to a reference value; the measurement response is verified as a correct response; and the measurement request is verified as a correct request by the request source.

The communication apparatus may further include (a6) a measurement preparation request transmitting unit which transmits, to the request source, a measurement preparation request for a preparation necessary for generating the measurement response, before the transmission of the measurement request.

Furthermore, (a7) the determination unit may determine that the measurement response is a correct response, in the case where first verification information generated using the authentication information is identical to second verification information generated using the authentication information by the request source.

In order to achieve the aforementioned object, the communication apparatus according to the present invention is also (b) a communication apparatus which requests for transmission of content data, the apparatus including: (b1) an authentication unit which shares authentication information with a request destination which responds to the request for the transmission of the content data; (b2) a measurement request receiving unit which receives, from the request destination, a measurement request which is generated using the authentication information by the request destination; (b3) a measurement response transmitting unit which transmits a measurement response which is generated using the authentication information immediately back to the request destination as a response to the measurement request; and a (b4) determination unit which determines whether or not the measurement request is correct.

The communication apparatus may further include (b5) a measurement preparation request receiving unit which receives, from the request destination, a measurement preparation request for a preparation which is necessary for generating the measurement response, before the reception of the measurement request.

Note that, the present invention may be realized not only as a communication apparatus but also as a communication system which includes a communication apparatus (server) of a request destination and a communication apparatus (client) of a request source that are mutually connected through a data communication network.

Furthermore, the present invention may be realized as a communication method for controlling a communication apparatus (a server or a client), as a communication program for causing a computer system to execute the communication method, or as a recording medium on which the communication program is recorded.

Effects of the Invention

As is clear from the aforementioned description, the present invention can provide a transmission time measurement method, a data transmission receiving system, a medium and an information aggregate, which can correctly measure a transmission time, share existing authentication processing, and does not perform unnecessary key exchange processing, by executing detection processing on the receiving apparatus side when the measurement value is less than or equal to the reference value, sharing the authentication processing for a transmission time measurement with the authentication processing for the encrypted transmission, and executing only the measurement processing and the registration processing when the measurement processing is activated by the measurement start request.

NUMERICAL REFERENCES

Figure 1:
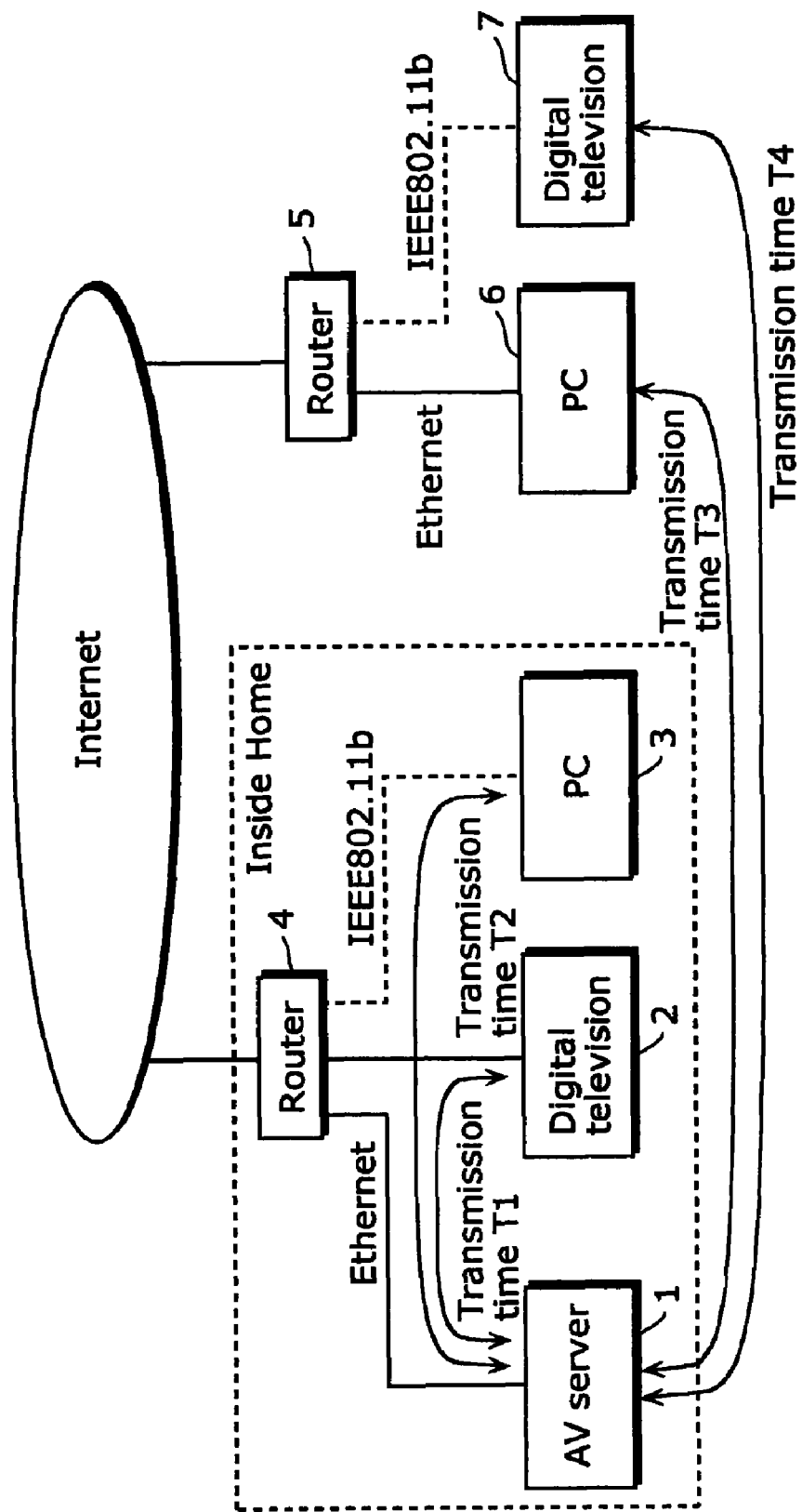
FIG. 1 is a diagram showing a configuration of the data transmitting/receiving system according to first and second embodiments of the present invention.

1 AV server
2 Digital television
3 PC
4 Router
5 Router
6 PC
7 Digital television
21 Transmitting/receiving unit
22 Encryption processing unit
23 Key exchange processing unit
24 Authentication processing unit
25 Transmission time measurement processing unit
26, 27 Receiving apparatus registration unit
28 Measurement start processing unit
31 Transmitting/receiving unit
32 Decryption processing unit
33 Key exchange processing unit
34 Authentication processing unit
35 Transmission time measurement processing unit
36 Measurement start processing unit

BEST MODE FOR CARRYING OUT THE INVENTION

First Embodiment

Hereinafter, the first embodiment of the present invention is described in detail with reference to FIG. 1 to FIG. 5.

<Outline>

In the present embodiment, (a) a communication apparatus (hereinafter, referred to as a transmitting apparatus), which responds to a request for transmission of content data, (a1) shares authentication information with a request source which requests the transmitting apparatus to transmit the content data, (a2) transmits the measurement request generated using the authentication information to the request source, (a3) receives, from the request source, the measurement response which is generated using the authentication information by the request source, as a response to the measurement request, (a4) measures the period of time from the transmission of the measurement request to the reception of the measurement response, as a round trip time, (a5) transmits, to the request source, a measurement preparation request for requesting a preparation which is necessary for generating a measurement response, before transmitting the measurement request, and (a6) determines that the request source is an eligible device as a transmission destination of the content data, after the measurement of the round trip time, in the case where the round trip time is less than or equal to a reference value, where the measurement response is verified as a correct response, and where the measurement request is verified as a correct request by the request source.

Furthermore, (b) the communication apparatus (hereinafter referred to as a receiving apparatus), which requests to transmit content data, (b1) shares the authentication information with the request destination which responds to the request for transmission of the content data, (b2) receives, from the request destination, the measurement request generated using the authentication information by the request destination, (b3) transmits the measurement response generated using the authentication information immediately back to the request destination as a response to the measurement request, and (b4) receives, from the request destination, the measurement preparation request for requesting a preparation which is necessary for generating the measurement response, before receiving the measurement request.

Then, the communication system having the transmitting apparatus and the receiving apparatus that are mutually connected through a data communication network (hereinafter, referred to as a data transmitting/receiving system) verifies whether or not the received measurement information, that are mutually received from one to the other, are correct in the case where the measurement value measured in the measurement process is less than or equal to the predetermined value, and determines that the measurement value is correct when the measurement information is correct, based on the transmission time measurement method according to the present embodiment.

Furthermore, in the data transmitting/receiving system of the present embodiment, after the authentication processing is executed, the transmission apparatus causes the measurement unit to measure a round trip time in the case where the receiving apparatus has not been registered. On the other hand, the data transmitting/receiving system executes key exchange processing when the determination unit determines that the measurement value is a correct value, and sequentially executes the key exchange processing in the case where the receiving apparatus has been registered.

Based on the above-mentioned description, the data transmitting/receiving system and the transmission time measurement method according to the present embodiment are described.

<Configuration>

FIG. 1 is a diagram showing a transmitting apparatus and a receiving apparatus which are included in the data transmitting/receiving system according to the present embodiment, and is a connection diagram in which an AV server, which is a transmitting apparatus, and a PC, a digital television, and a router, which are receiving apparatuses, are connected.

As shown in FIG. 1, an AV server 1, a digital television 2, a PC 3, and a router 4 are placed in a home. The AV server 1 and the digital television 2 are connected to the router 4 by the Ethernet™ and the PC 3 is connected to the router 4 by a wireless media (IEEE 802.11b.).

The router 4 is also connected to a router 5, which is placed outside the home, via the Internet. The router 5 is connected to the PC 6 and the digital television 7 that are the receiving apparatuses. The PC 6 is connected to the router 5 by the Ethernet™ and the digital television 7 is connected to the router 5 by a wireless media (IEEE 802.11b.).

Figure 2:
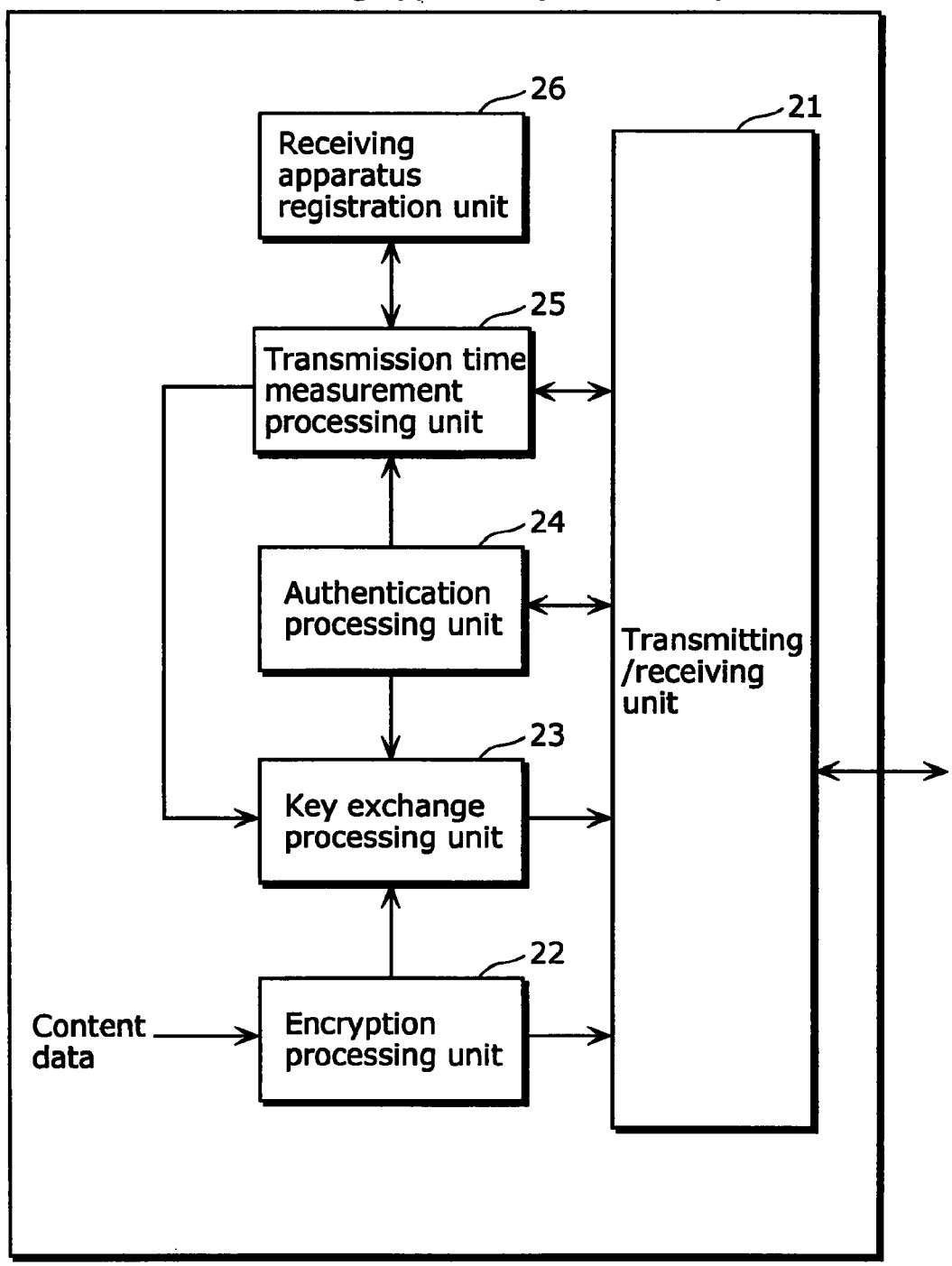
FIG. 2 is a diagram showing a configuration of a transmitting apparatus according to the first embodiment of the present invention.

FIG. 2 shows a configuration of the AV server 1 which is a transmitting apparatus.

As shown in FIG. 2, the AV server 1 includes a transmitting/receiving unit 21, an encryption processing unit 22, a key exchange processing unit 23, an authentication processing unit 24, a transmission time measurement processing unit 25, and a receiving apparatus registration unit 26. Here, the transmission time measurement processing unit 25 corresponds respectively to a measurement preparation request transmitting unit, a measurement preparation response receiving unit, a measurement preparation unit, a measurement request transmitting unit, a measurement response receiving unit, a measurement unit, and a determination unit in the present invention. The receiving apparatus registration unit 26 corresponds to a registration unit and a registration confirmation unit.

The transmitting/receiving unit 21 is a digital interface for transmitting AV data to a network and transmitting or receiving a command and the like to or from another device which is connected to the network.

The encryption processing unit 22 encrypts the AV data reproduced by the content recording unit (not shown in the diagram).

The key exchange processing unit 23 generates an exchange key which is used for decrypting the encrypted AV data, encrypts the exchange key by using the authentication information received by the authentication processing unit 24, and outputs the encrypted exchange key to the transmitting/receiving unit 21.

The authentication processing unit 24 receives an authentication request from the receiving apparatus, performs authentication processing, and receives, together with certificate information, flag information which indicates whether or not the receiving apparatus has an RTT measurement function, while sharing the authentication information with the receiving apparatus.

The transmission time measurement processing unit 25 generates a measurement preparation request and a measurement request, transmits the generated requests via the transmitting/receiving unit 21, and processes the received measurement preparation request response and the measurement request response. Furthermore, the transmission time measurement processing unit 25 measures an RTT as a round trip time which is the period of time from the transmission of the measurement request to the reception of the measurement request response, and when the RTT is less than or equal to a predetermined reference value, generates a verification request, transmits the generated verification request via the transmitting/receiving unit 21, processes the received verification request response, and determines whether or not the measured RTT is correct.

The receiving apparatus registration unit 26 stores a device ID of the receiving apparatus which is determined to have the RTT of less than or equal to the reference value by the transmission time measurement processing unit 25. Here, the device ID is assigned previously by a key management center, and is information for specifying a device.

Figure 3:
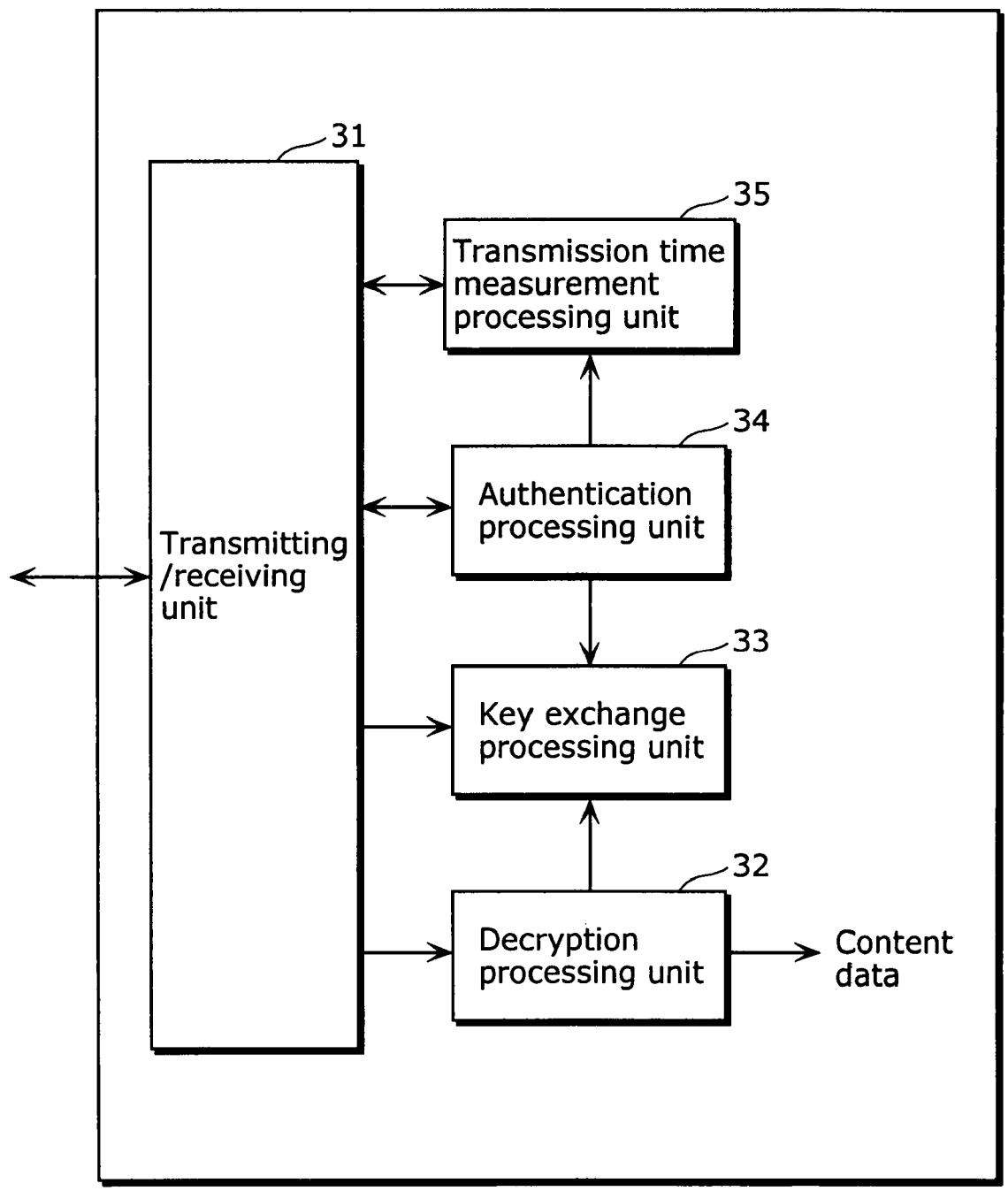
FIG. 3 is a diagram showing a configuration of a receiving apparatus according to the first embodiment of the present invention.

The data transmitting/receiving units of respective digital televisions 2 and 7, PC 3, and PC 6 that are receiving apparatuses have similar configurations. FIG. 3 shows a configuration of the data transmitting/receiving unit of the receiving apparatus (such as digital television 2).

As shown in FIG. 3, the receiving apparatus (such as digital television 2) includes a transmitting/receiving unit 31, a decryption processing unit 32, a key exchange processing unit 33, an authentication processing unit 34, and a transmission time measurement processing unit 35. Here, the transmission time measurement processing unit 35 corresponds to a measurement preparation request receiving unit, a measurement preparation response transmitting unit, a measurement preparation unit, a measurement request receiving unit, a measurement response transmitting unit, and a determination unit, of the present invention.

The transmitting/receiving unit 31 is a digital interface for receiving the AV data transmitted via a network, and transmitting or receiving a command and the like to or from another device which is connected to the network.

The decryption processing unit 32 receives an exchange key transmitted from the key exchange processing unit 33, generates a decryption key using the received exchange key, receives AV data via the transmitting/receiving unit 31, and decrypts the received encrypted AV data. The AV data, which is decrypted by the decryption processing unit 32 and now is in plain text, is decoded by a decoder (not shown in the diagram), and is displayed to a monitor (not shown in the diagram).

The key exchange processing unit 33 receives an exchange key via the transmitting/receiving unit 31, receives the authentication information transmitted by the authentication processing unit 34, processes the received exchange key using the received authentication information, and transmits to the decryption processing unit 32.

The authentication processing unit 34 requests the authentication processing unit 24 of the AV server 1 to start authentication processing via the transmitting/receiving unit 31, executes the authentication processing, and shares the authentication information with the authentication processing unit 24 of the AV server 1. Furthermore, the authentication processing unit 34 transmits, to the AV server 1, the flag information which indicates whether or not the receiving apparatus has an RTT measurement function, together with the certificate information via the transmitting/receiving unit 31.

The transmission time measurement processing unit 35 receives and processes the measurement preparation request, measurement request, and verification request transmitted from the AV server 1, via the transmitting/receiving unit 31, generates a measurement preparation request, a measurement request response, and a verification request response, and transmits them to the AV server 1 via the transmitting/receiving unit 31.

<Operations>

Next, the operations of the present embodiment configured as described in the above are described.

Figure 4:
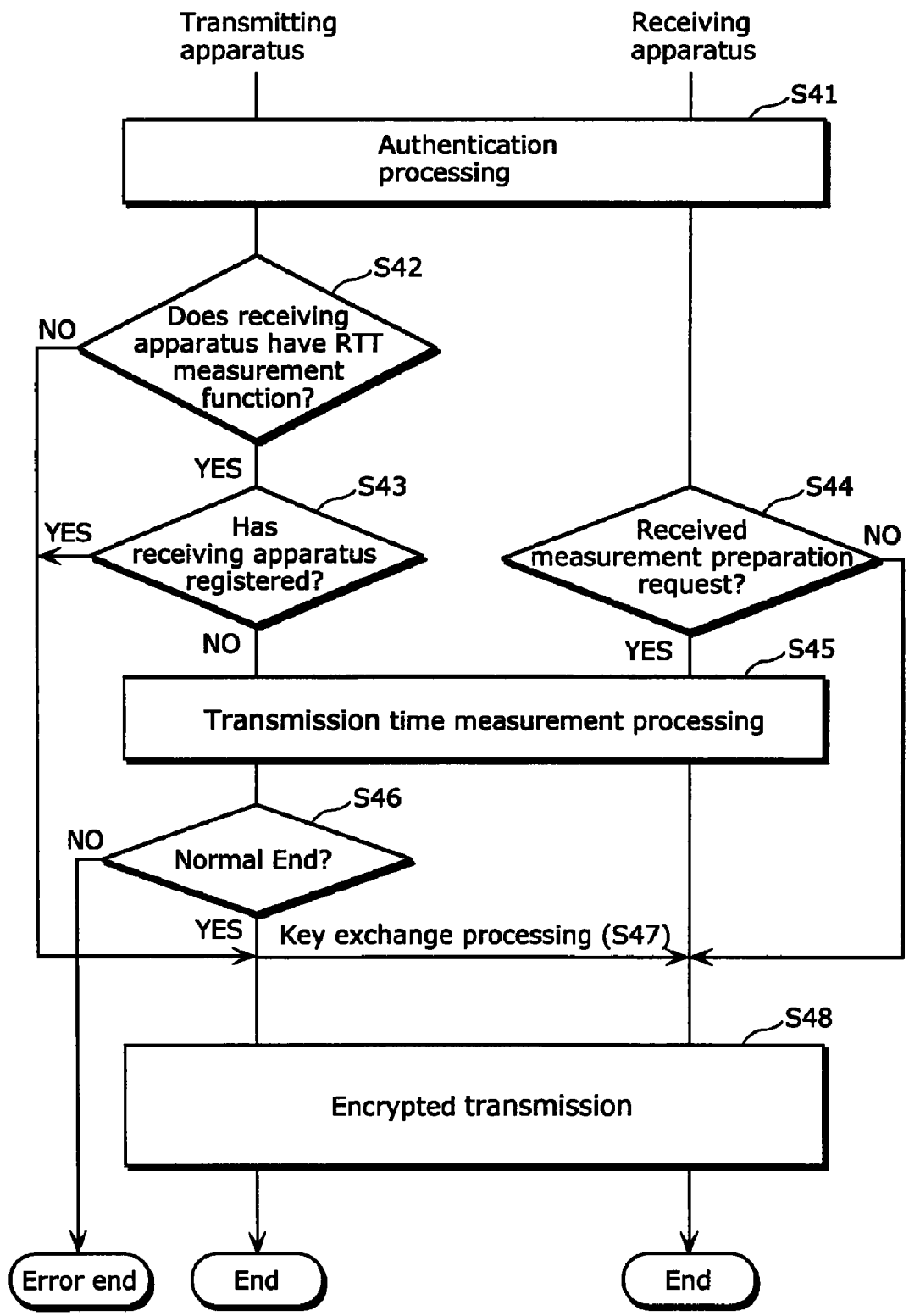
FIG. 4 is a diagram showing a processing sequence at the time of encrypted transmission according to the first embodiment of the present invention.

FIG. 4 shows a flow of a process from authentication to encrypted transmission when an encrypted transmission is performed by the transmitting apparatus (AV server 1) and the receiving apparatus (digital television 2).

As shown in FIG. 4, first, the authentication processing unit 34 of the receiving apparatus transmits an authentication request to the transmitting apparatus, and starts authentication processing (S41).

After the authentication processing (S41), the transmission time measurement processing unit 25 of the transmitting apparatus confirms (S42) the flag information which indicates whether or not the receiving apparatus has an RTT measurement function received in the authentication processing (S41), and moves on to next processing (S43) when the receiving apparatus has the RTT measurement function. In the case where the receiving apparatus does not have an RTT measurement function, the transmission time measurement processing unit 25 moves on to key exchange processing (S47).

Next, the receiving apparatus registration unit 26 of the transmitting apparatus determines whether or not the receiving apparatus has been registered (S43), and in the case where the receiving apparatus has not been registered, moves on to next transmission time measurement processing (S45). In the case where the receiving apparatus has been registered, the receiving apparatus registration unit 26 moves on to the key exchange processing (S47).

After the authentication processing (S41), the receiving apparatus is in a wait state for receiving a request. The receiving apparatus checks the received request (S44), and moves on to the transmission time measurement processing (S45) when receiving the measurement preparation request. When receiving the exchange key, the receiving apparatus moves on to the key exchange processing (S47).

After the transmission time measurement processing (S45), the transmitting apparatus confirms whether or not the transmission time measurement processing has been correctly finished (S46). In the case where the process has been correctly finished, the transmitting apparatus executes the key exchange processing (S47), and in the case where the process has not been correctly finished, finishes the transmission processing as an error.

After the transmission time measurement processing (S45), the receiving apparatus is in a wait state for receiving a request. The receiving apparatus executes the key exchange processing (S47) when receiving the exchange key.

After the key exchange processing (S47), the transmitting apparatus encrypts content data, and transmits the encrypted content data. The receiving apparatus receives the encrypted content data, and decrypts the encrypted content data (S48).

Figure 5:
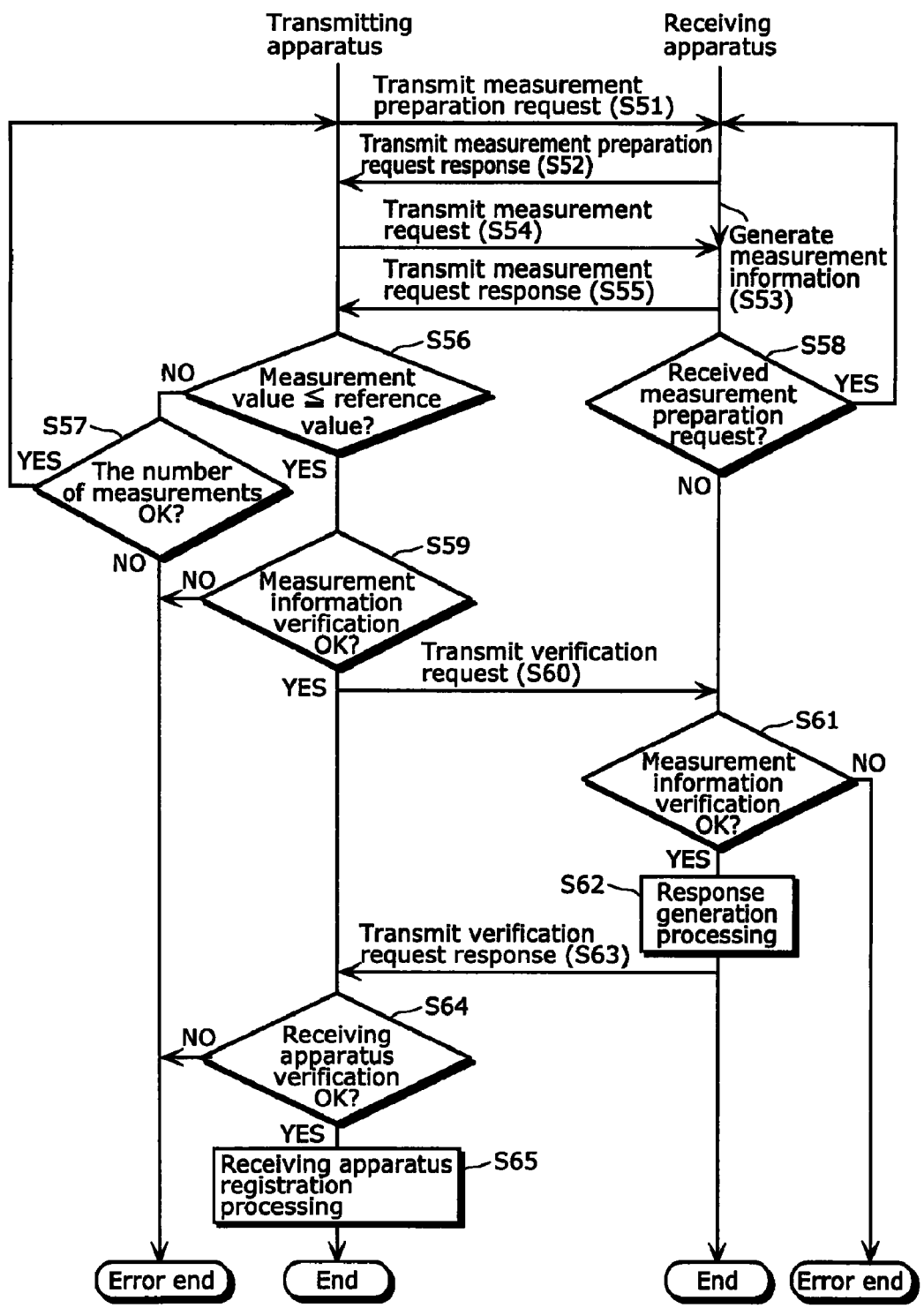
FIG. 5 is a diagram showing a processing sequence at the time of the transmission time measurement processing according to the first embodiment of the present invention.

FIG. 5 is a flowchart showing a detailed process of the transmission time measurement process (S45).

As shown in FIG. 5, first, the transmitting apparatus and the receiving apparatus execute, as measurement preparation processes, a measurement preparation request transmitting process (S51) to a measurement preparation process (S53). The transmitting apparatus transmits, to the receiving apparatus, the measurement preparation request in which a measurement number N is stored (S51), and generates transmitting apparatus measurement information. The receiving apparatus transmits the measurement preparation request response to the transmitting apparatus, as a response to the measurement preparation request (S52). When receiving the measurement preparation request response, the transmitting apparatus prepares for the measurement processing. After transmitting the measurement preparation response, the receiving apparatus generates receiving apparatus measurement information so as to prepare for the measurement processing (S53).

In the measurement preparation process, the transmitting apparatus measurement information and the receiving apparatus measurement information are generated by the following procedure. First, common verification information Kvrfy (160 bits) which is common secret information is generated using a Kauth (96 bits) and a measurement times value N (initial value 0) supplied from the authentication processing unit 24 or the authentication processing unit 34. The common verification information Kvrfy (160 bits) is divided into a Kvrfy (upper 80 bits) and a Kvrfy (lower 80 bits). The transmitting apparatus prepares the Kvrfy (upper 80 bits) as the transmitting apparatus measurement information and the Kvrfy (lower 80 bits) as verification information of the receiving apparatus measurement information. The receiving apparatus prepares the Kvrfy (lower 80 bits) as the receiving apparatus measurement information and the Kvrfy (upper 80 bits) as verification information of the transmitting apparatus measurement information.

Next, the transmitting apparatus and the receiving apparatus execute, as measurement processes, a measurement request transmitting process (S54) and an RTT measurement process (S55). The transmitting apparatus stores the transmitting apparatus measurement information into the measurement request, and transmits the measurement request. The receiving apparatus stores the receiving apparatus measurement information into a measurement request response as the measurement process, and transmits the measurement request (S54). Here, the transmitting apparatus receives the measurement request response responded by the receiving apparatus, and measures an RTT (S55).

Following that, the transmitting apparatus and the receiving apparatus execute, as judgment processes, a reference value judgment process (S56) to a receiving apparatus verification information verification process (S64). The transmitting apparatus checks the measurement value (RTT) (S56), and when the measurement value is less than or equal to a reference value (Tmax), terminates the measurement processing, and proceeds to the next processing. When the measurement value is greater than the reference value (S 56: NO), the transmitting apparatus checks the number of measurements (S57). When the number of measurements is not reached the predetermined number of measurements (S57: Yes), the transmitting apparatus returns to the measurement preparation request transmitting process (S51), and repeats the measurement. After transmitting the measurement request response, the receiving apparatus is in a wait state for receiving the request. When receiving the measurement preparation request, the receiving apparatus returns to the measurement preparation request response process (S52). The receiving apparatus then repeatedly performs the processing in association with the iteration by the transmitting apparatus (S58).

Next, the transmitting apparatus compares the receiving apparatus measurement information stored in the received measurement request response with the prepared verification information (S59), and when the measurement information does not match the verification information (S 59: NO) terminates the processing as an error. When the measurement information matches the verification information (S 59: YES), the transmitting apparatus transmits a verification request (S60). The receiving apparatus receives the verification request, and compares the transmitting apparatus measurement information stored in the received measurement request with the prepared verification information (S61). When the measurement information does not match the verification information (S 61: NO), the receiving apparatus terminates the processing as an error. When the measurement information matches the verification information (S61:YES), the receiving apparatus generates receiving apparatus verification information from the authentication information Kauth (S62), stores the receiving apparatus verification information into the verification request response, and transmits the verification request response (563).

The transmitting apparatus verifies the received receiving apparatus verification information so as to determine whether or not the final measurement value is a correct value (S64). When the measurement value is incorrect (S64: NO), the transmitting apparatus finishes the processing as an error, and when the measurement value is correct (S 64:YES), moves on to the next registration processing.

Finally, the transmitting apparatus registers, at the receiving apparatus registration unit 26, a device ID of the receiving apparatus which is determined to have the measurement value which is less than or equal to the reference value and to be correct in the judgment processing (S65).

For example, in the transmission between respective devices shown in FIG. 1, it is assumed that the round trip time of the Ethernet™ as 0.02 ms (milliseconds), the wireless (802.11b) round trip time as 3 ms, the processing delay time of a router as 0.5 ms, the round trip time of the Internet as 10 ms, and the processing delay time of the receiving apparatus as 0.2 ms. In addition, it is assumed that two routers are connected on a path. Accordingly, the transmission time (RTT) between the AV server 1 which is the transmission apparatus and each receiving apparatus is described as following (1) and (2) between home devices, which are devices placed in a home. Furthermore, the transmission time (RTT) between a home device and an external device, which is a device placed outside the home, is described as following (3) and (4).
(Between home devices)
(1) RTT with the digital television $$RTT(T1)=0.02+0.02+0.2=0.24 \text{ ms}$$

(2) RTT with PC 3

$$RTT(T2)=0.02+3+0.2=3.22 \text{ ms}$$

(Between home device and external device)
(3) RTT with the PC 6

$$RTT(T3)=0.02+0.5\times4+10+0.02+0.2=12.24 \text{ ms}$$

(4) RTT with the digital television 7

$$RTT(T4)=0.02+0.5\times4+10+3+0.2=15.22 \text{ ms}$$

Here, if the reference value Tmax=7 ms, the target receiving apparatus is registered because said receiving apparatus has the RTT of less than or equal to 7 ms with the digital television 2 and PC 3 that are the home devices. Therefore, the key exchange processing (S47) and the encrypted transmission processing (S48) are executed among these home devices. On the other hand, the target receiving apparatus is not registered because said receiving apparatus has the RTT of greater than 7 ms with the PC 6 and digital television 7 that are the external devices. Therefore, the key exchange processing (S47) and the encrypted transmission processing (S48) are not executed among these external devices.

Based on the above-identified operations, when the measurement value of RTT is less than or equal to the reference value and is determined as a correct RTT for the receiving apparatus, the key exchange processing is executed so that the receiving apparatus can decrypt the encrypted data.

As described in the above, the transmission time measurement method of the present embodiment verifies whether or not the measurement information mutually received from one to the other devices are correct, when the measurement value measured in the measurement processing is less than or equal to the predetermined value. Accordingly, the receiving apparatus does not execute the detection processing during the measurement request processing so that the verification processing time is not added to the transmission time and a round trip time can be correctly measured. The unique effect of the present embodiment thus can be obtained.

Furthermore, in the data transmitting/receiving system of the present embodiment, after the authentication processing, the transmission apparatus causes the measurement unit to measure a round trip time in the case where the receiving apparatus has not been registered, executes key exchange processing when the determination unit determines that the measurement value is a correct value, and sequentially executes the key exchange processing in the case where the receiving apparatus has been registered. On the other hand, in the case where the receiving apparatus has been registered, the key exchange processing is sequentially executed. Therefore, the authentication processing for executing the key exchange does not need to be changed, and can be shared as the authentication processing for the transmission time measurement. The unique effect of the present embodiment thus can be obtained.

Note that, in the present embodiment, common verification information is generated from the authentication information and the common verification information is divided into receiving apparatus measurement information and transmitting apparatus measurement information. However, the measurement information may be generated using other means.

Furthermore, in the present embodiment, the transmitting apparatus transmits the measurement preparation request, and then generates the transmitting apparatus measurement information. However, the transmitting apparatus measurement information may be generated at a different timing prior to the transmission of the measurement request.

Furthermore, in the present embodiment, four receiving apparatuses are used. However, the arbitral number of receiving apparatuses may be connected.

Furthermore, in the present embodiment, the Ethernet™ and IEEE 802.11b are described as a transmission media of a network. However, other transmission media such as IEEE 802.11a/g/n, or Bluetooth may be used as well.

Furthermore, whereas the reference value is set at 7 ms in the present embodiment, a different reference value may be set instead.

Second Embodiment

Hereinafter, the second embodiment of the present invention is described in detail with reference to FIG. 6 to FIG. 9.
<Outline>
The data transmitting/receiving system according to the present embodiment, when the transmitting apparatus or the receiving apparatus transmits the measurement start request, after the authentication processing, the transmitting apparatus or the receiving apparatus causes the measurement unit to measure the transmission time, registers the receiving apparatus in the case where the determination unit determines that the measurement value is a correct value, and does not execute the key exchange processing.

<Configuration>

As similar to the first embodiment, FIG. 1 shows a transmitting apparatus and a receiving apparatus which are included in the data transmitting/receiving system according to the present embodiment.

Figure 6:
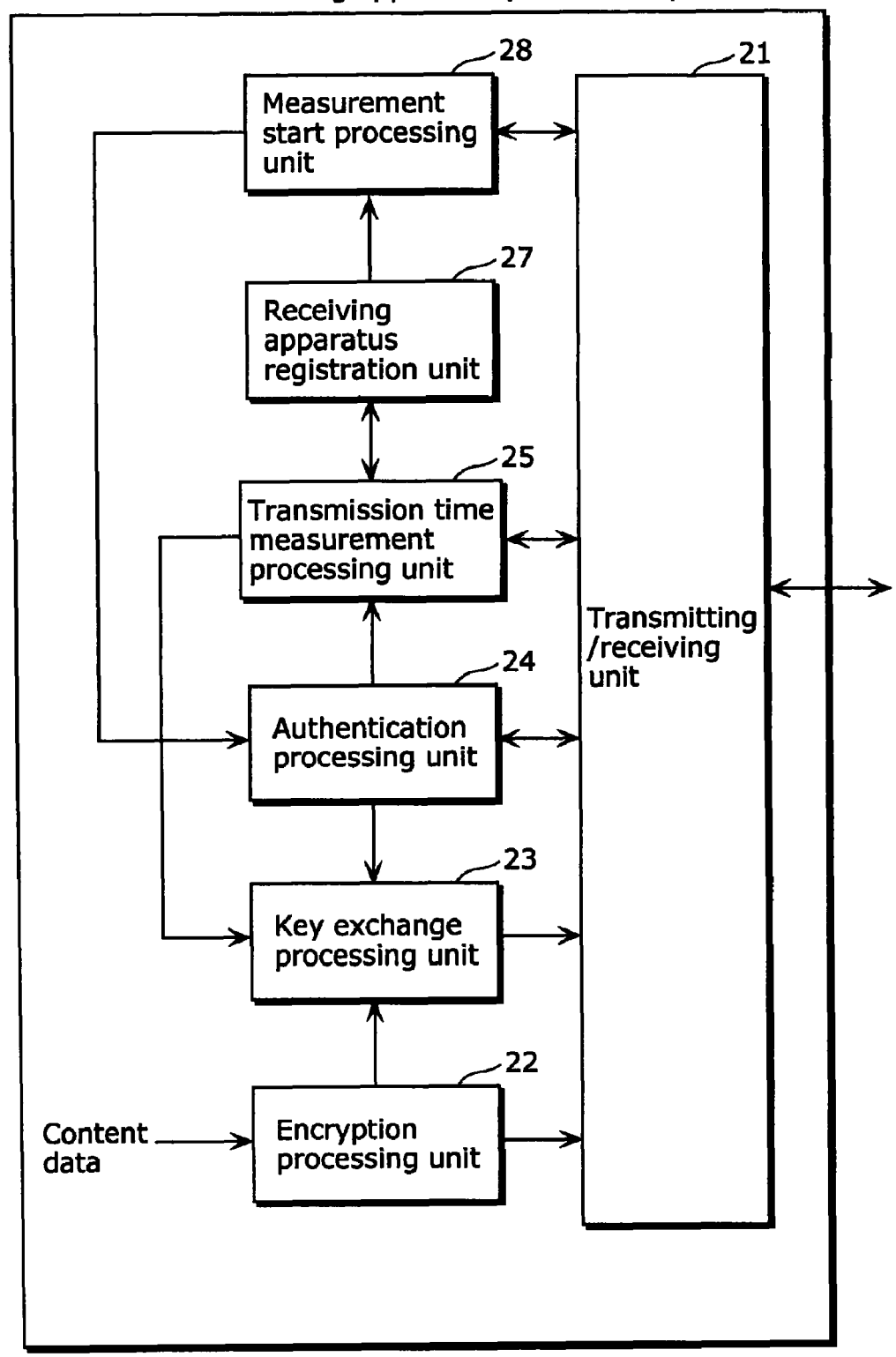
FIG. 6 is a diagram showing a configuration of a transmitting apparatus according to the second embodiment of the present invention.

FIG. 6 shows a configuration of the AV server 1 which is a transmitting apparatus according to the present embodiment.

The AV server 1 includes a transmitting/receiving unit 21, an encryption processing unit 22, a key exchange processing unit 23, an authentication processing unit 24, a transmission time measurement processing unit 25, a receiving apparatus registration unit 27, and a measurement start processing unit 28. Here, the transmission time measurement processing unit 35 corresponds to a measurement preparation unit, a measurement unit, and a determination unit in the present invention. The receiving apparatus registration unit 27 corresponds to a registration unit, a registration confirmation unit, and a registration canceling unit in the present invention. The measurement start processing unit 28 corresponds to a measurement start unit in the present invention.

The differences between the configuration of the transmitting apparatus according to the present embodiment and the configuration of the transmitting apparatus according to the first embodiment are the receiving apparatus registration unit 27 and the measurement start processing unit 28. Therefore, descriptions about other same constituent elements are omitted.

The receiving apparatus registration unit 27 stores a device ID of the receiving apparatus which is determined to have the RTT of less than or equal to the reference value by the transmission time measurement processing unit 25, and registers the receiving apparatus. Furthermore, the receiving apparatus registration unit 27 cancels the registration when the predetermined effective time expires after said registration.

The measurement start processing unit 28 checks a remaining time of the effective time, when the remaining time becomes 0, transmits a measurement start request, and starts authentication processing for the measurement processing. The measurement start processing unit 28 also starts the authentication processing for the measurement processing when the measurement start request is received.

Figure 7:
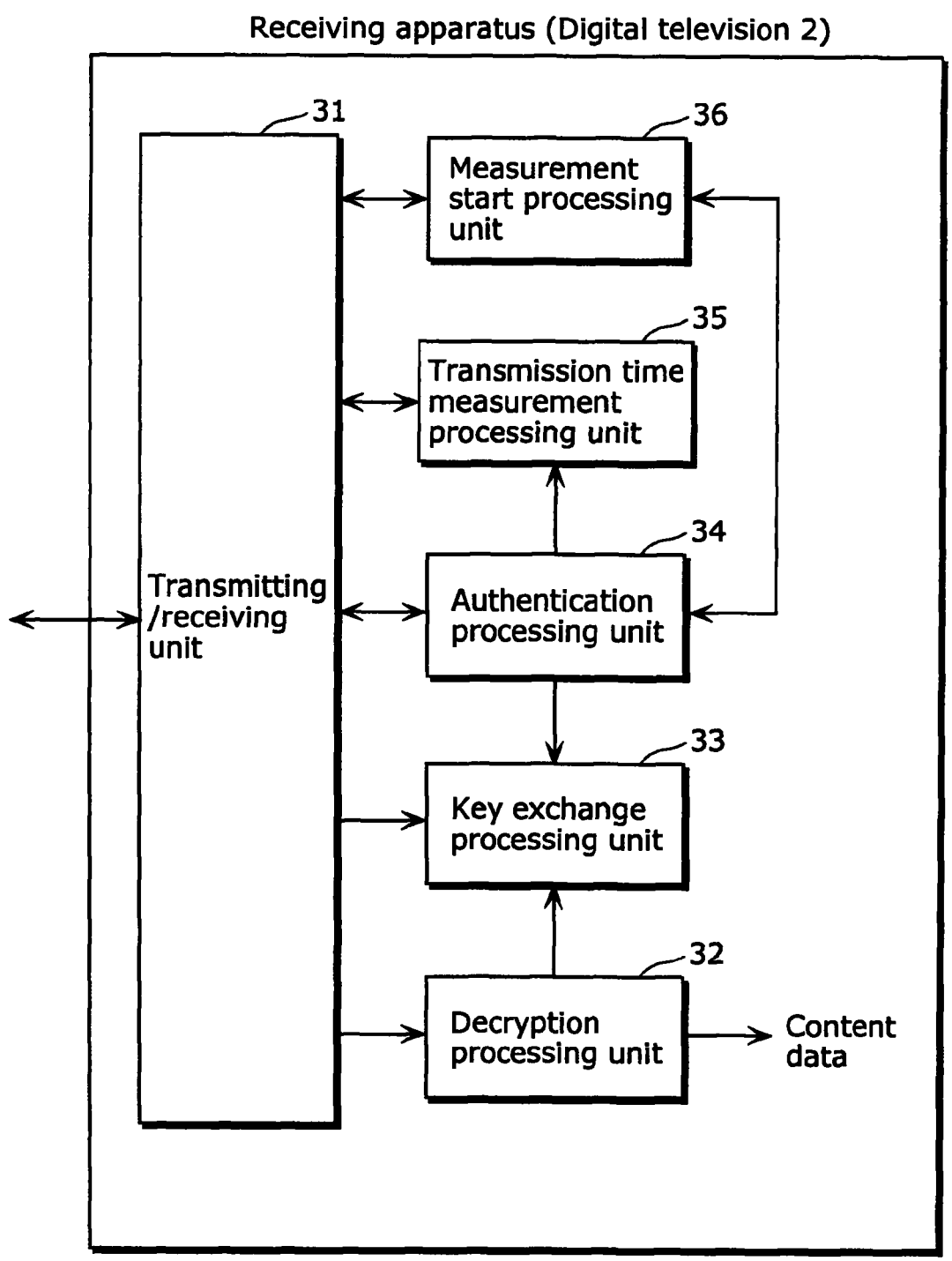
FIG. 7 is a diagram showing a configuration of a receiving apparatus according to the second embodiment of the present invention.

FIG. 7 shows a configuration of the data transmitting/receiving unit of a receiving apparatus (digital television 2).

The receiving apparatus includes a transmitting/receiving unit 31, a decryption processing unit 32, a key exchange processing unit 33, an authentication processing unit 34, a transmission time measurement processing unit 35, and a measurement start processing unit 36. Here, the transmission time measurement processing unit 35 corresponds to a measurement preparation request receiving unit, a measurement preparation response transmitting unit, a measurement preparation unit, a measurement request receiving unit, a measurement response transmitting unit, and a determination unit, of the present invention. The measurement start processing unit corresponds to a measurement start determination unit, a measurement start request transmitting unit, and a measurement start response receiving unit.

The difference between the configuration of the receiving apparatus of the present embodiment and the configuration of the receiving apparatus of the first embodiment is the measurement start processing unit 36. Therefore, the descriptions about other same constituent elements are omitted.

When the reception of the encrypted data is finished or when the transmission time measurement processing is not executed between the authentication processing and the key exchange processing, the measurement start processing unit 36 transmits the measurement start request and starts the authentication processing for the measurement processing when the key exchange processing is finished. The measurement start processing unit 36 also starts the authentication processing for the measurement processing when the measurement start request is received.

<Operations>

The operation of the data transmission system according to the present embodiment is described with reference to FIG. 8 and FIG. 9.

Figure 8:
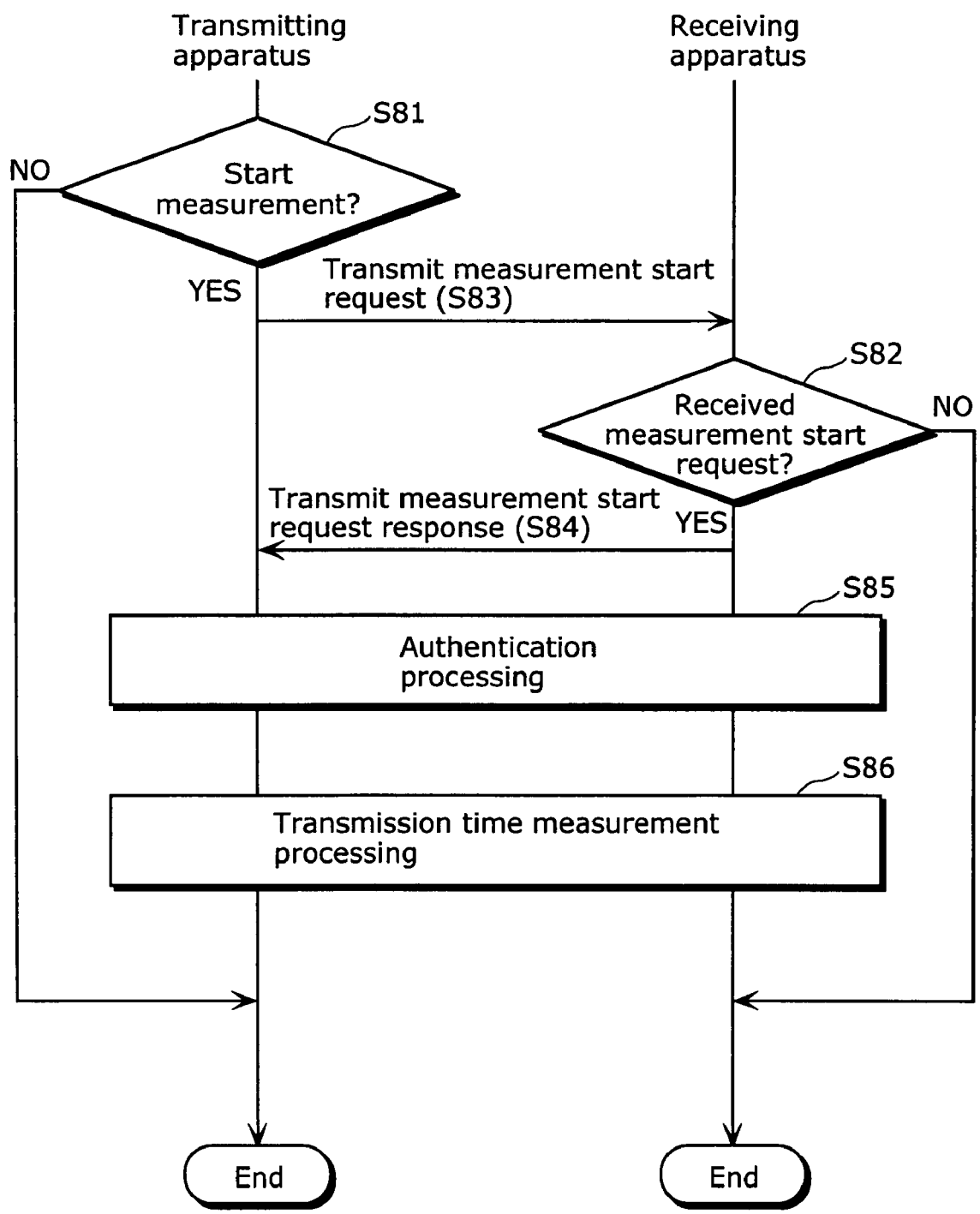
FIG. 8 is a diagram showing a processing sequence when the transmitting apparatus starts the transmission time measurement processing according to the second embodiment of the present invention.

FIG. 8 is a diagram showing an operation sequence when the transmitting apparatus starts the measurement processing.

The measurement start processing unit 28 of the transmitting apparatus checks the registered effective time which is managed by the receiving apparatus registration unit 27 (S81), determines whether or not the remaining time of the effective time is 0, and when the remaining time is determined to be 0, transmits the measurement start request to the receiving apparatus (S83). The measurement start processing unit 36 of the receiving apparatus checks the received request (S82), transmits a response when receiving the measurement start request (S84), and requests the authentication processing unit 34 to start authentication processing. The authentication processing unit 34 issues an authentication request, and executes the authentication processing (S85). This authentication processing (S85) shares the same processing as the authentication processing (S41) performed when the key exchange processing is executed.

When the authentication processing (S85) is finished, the transmission time measurement processing unit 25 of the transmitting apparatus executes the transmission time measurement processing (S86), and when it is determined that the measurement value is less than or equal to the reference value and is correct, registers the receiving apparatus, and finishes the processing. When the measurement processing is started by transmitting the measurement start request, the key exchange processing is not executed. Note that, the detailed operations of the transmission time processing (S86) are the same as the transmission time measurement processing (S45) of the first embodiment as shown in FIG. 5.

In this case, the registration of the receiving apparatus can always be effective. Therefore, it is not necessary to execute the transmission time measurement processing when the key exchange processing is executed for the encrypted transmission.

Figure 9:
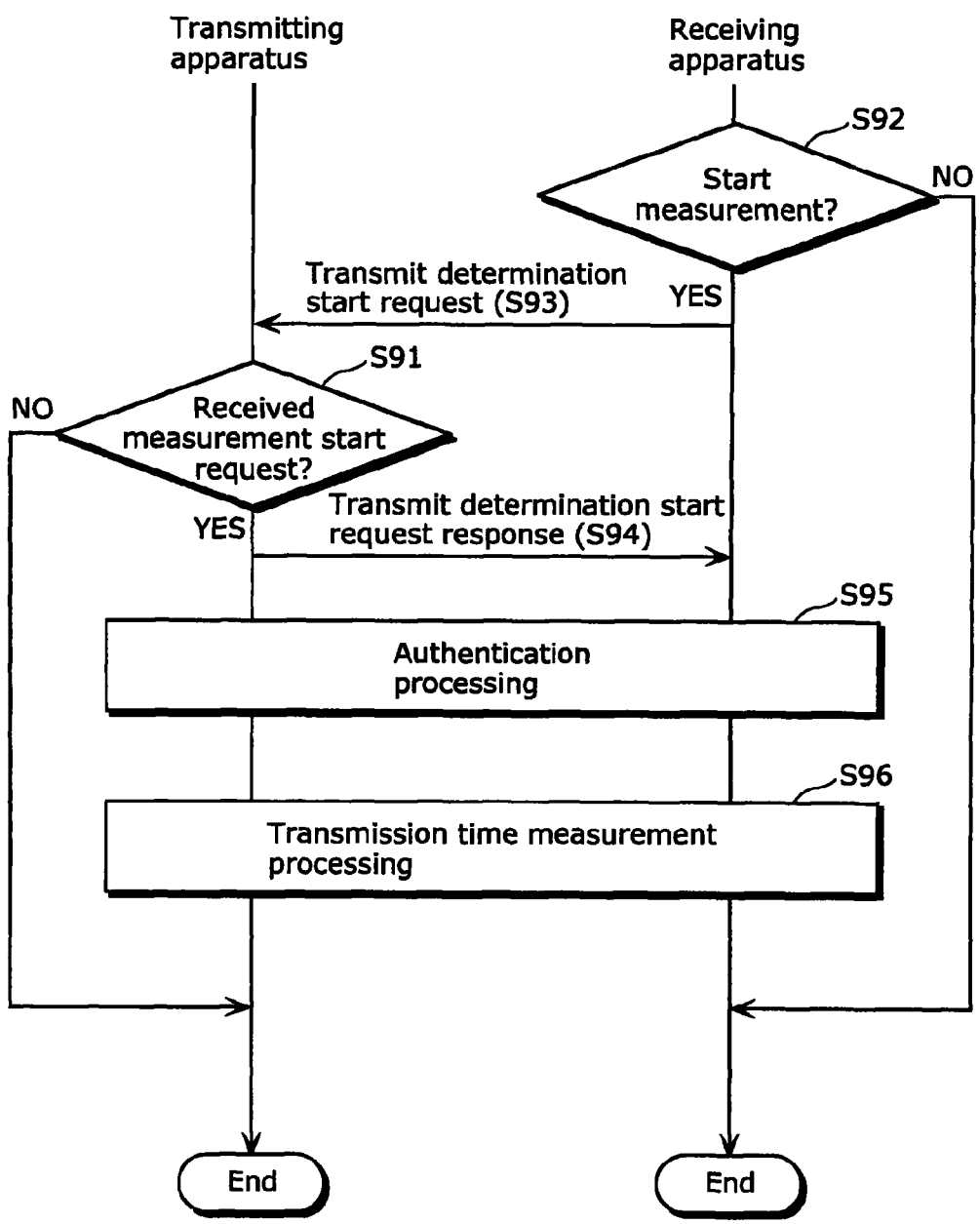
FIG. 9 is a diagram showing a processing sequence when the receiving apparatus starts the transmission time measurement processing according to the second embodiment of the present invention.
Figure 10:
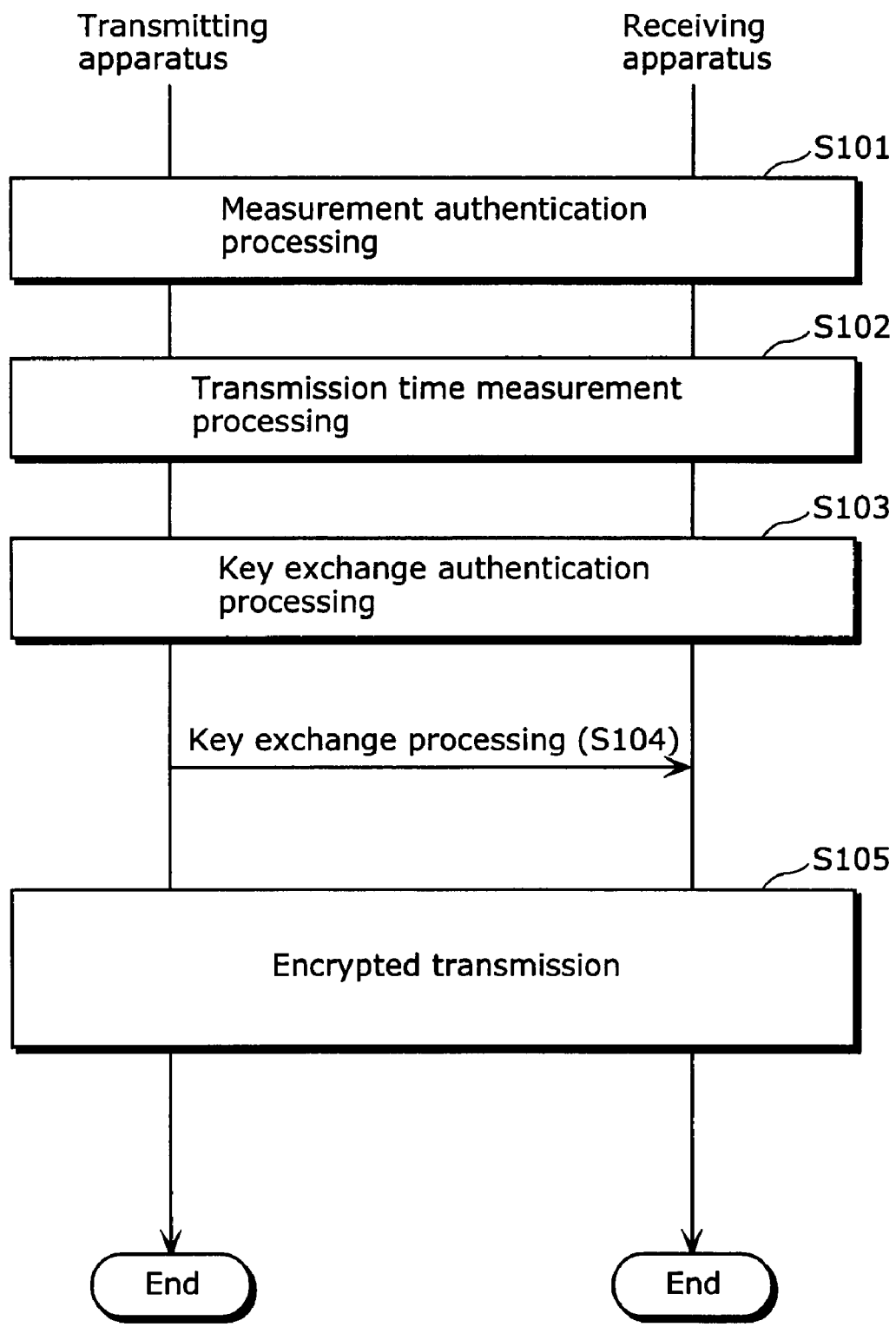
FIG. 10 is a diagram showing a processing sequence at the time of encrypted transmission in the conventional data transmitting/receiving system.
Figure 11:
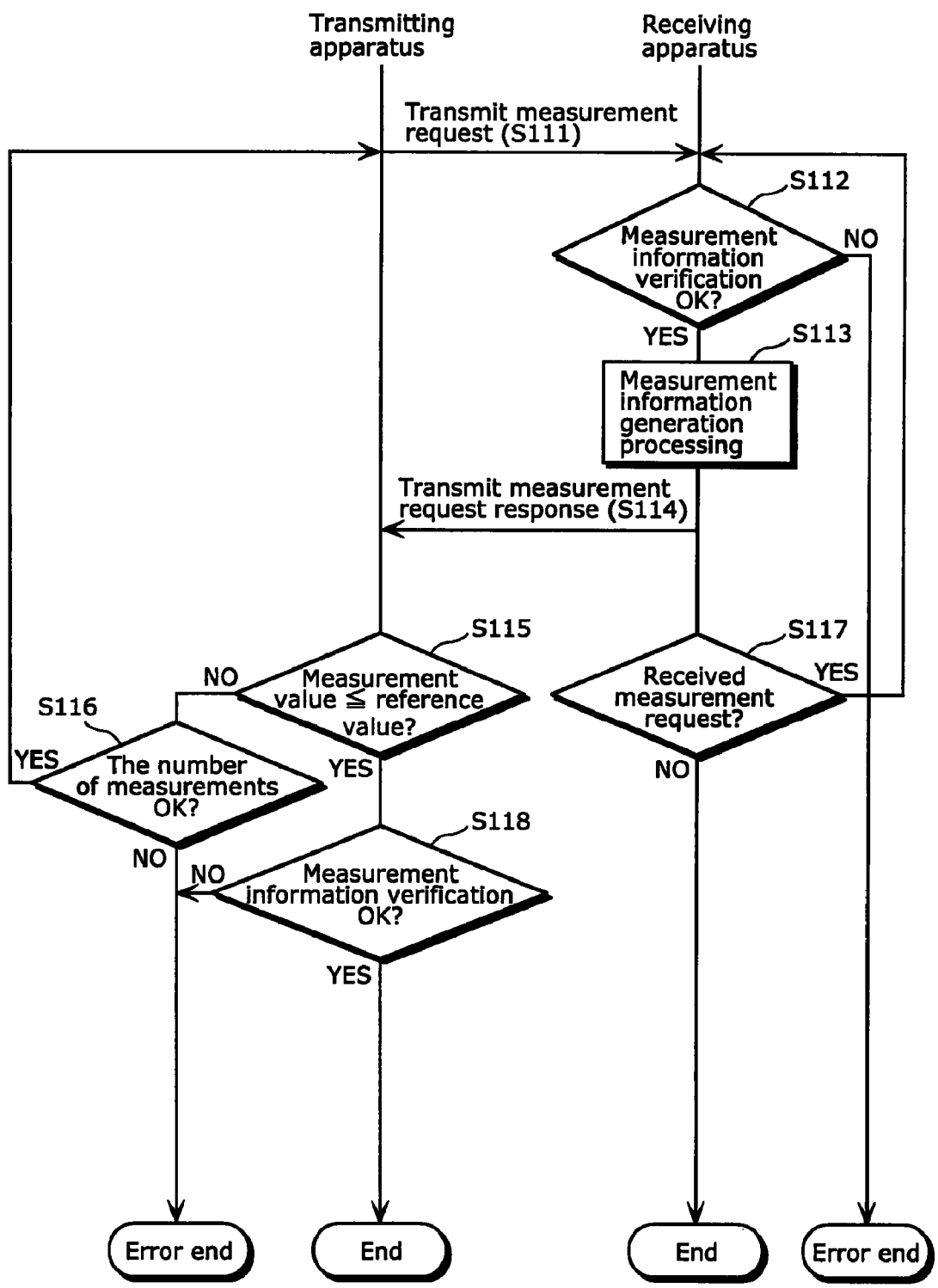
FIG. 11 is a diagram showing a processing sequence of the transmission time measurement processing in the conventional data transmitting/receiving system.

FIG. 9 is a diagram showing an operation sequence when the receiving apparatus starts the measurement processing, in the present embodiment.

The measurement start processing unit 36 of the receiving apparatus checks the received data, when the reception of the encrypted data is finished or when the transmission time measurement processing is not executed between the authentication processing and the key exchange processing, determines to start the measurement processing (S92) when receiving the exchange key, and transmits the measurement start request to the transmitting apparatus (S93). The measurement start processing unit 28 of the transmitting apparatus checks the received request (S91), and transmits a response when receiving the measurement start request (S94). The receiving apparatus then receives the response, and requests the authentication processing unit 34 to start the authentication processing. The authentication processing unit 34 issues an authentication request, and executes the authentication processing (S95). This authentication processing (S95) shares the same processing as the authentication processing (S41) performed when the key exchange processing is executed.

When the authentication processing (S95) is finished, the transmission time measurement processing unit 25 of the transmitting apparatus executes the transmission time measurement processing (S96), and when the measurement value is determined to be less than or equal to the reference value and to be correct measurement value, registers the receiving apparatus, and finishes the processing. When the measurement processing is started by transmitting the measurement start request, the key exchange processing is not executed. Note that, the detailed operations of the transmission time measurement processing (596) are the same as the transmission time measurement processing (S45) of the first embodiment as shown in FIG. 5.

Also in this case, the registration of the receiving apparatus can always be effective. Therefore, it is not necessary to execute the transmission time measurement processing when the key exchange processing is executed for the encrypted transmission.

As described in the above, the data transmitting/receiving system according to the present embodiment, when the transmitting apparatus or the receiving apparatus transmits the measurement start request, after the authentication processing, causes the measurement unit to measure the transmission time, and registers the receiving apparatus in the case where the determination unit determines that the measurement value is a correct value. Accordingly, the effect unique to the present embodiment that the authentication processing for executing the key exchange processing does not need to be changed, and can be commonly used as the authentication processing for the transmission time measurement processing, and that unnecessary key exchange processing, is not executed.

The transmitting apparatus in the data transmitting/receiving system according to the present embodiment checks the remaining time of the registered effective time, and starts the transmission time measurement processing. Therefore, said registration is not cancelled, and when the authentication processing and the key exchange processing are executed for performing the encrypted transmission, the transmission time measurement processing does not need to be executed, thus allowing the data transmitting/receiving system to obtain the effect of the present embodiment that the delay time occurred at the time of transmission start is shortened.

Furthermore, the receiving apparatus in the data transmitting/receiving system according to the present embodiment, when the reception of the encrypted data is finished or when the transmission time measurement processing is not executed between the authentication processing and the key exchange processing, starts the transmission time measurement processing at the time of receiving the exchange key. Therefore, said registration is not cancelled, and when the authentication processing and the key exchange processing are executed for performing the encrypted transmission, the transmission time measurement processing does not need to be executed, thus allowing the data transmitting/receiving system to obtain the effect of the present embodiment that the delay time occurred at the time of the transmission start is shortened. Furthermore, in the case of starting the transmission time measurement processing when receiving the exchange key, the effect unique to the present embodiment of executing the measurement start processing and the measurement processing using the same connection as for the authentication key exchange processing can be obtained.

Note that, whereas, in the present embodiment, the transmitting apparatus starts the transmission time measurement processing when the remaining time of the registered effective time becomes 0, the transmission time measurement processing may be started when the remaining time is less than or equal to the predetermined value or based on the combination of the remaining time and other conditions.

Furthermore, whereas, in the present embodiment, the receiving apparatus starts the transmission time measurement processing when the reception of the encrypted data is finished or when the exchange key is received, the transmission time measurement processing may not be started when the transmitting apparatus estimates the registered remaining time of the self device and determines that there is an efficient remaining time.

The present invention also applies to a medium, which can be processed by a computer, on which a program and/or data for causing a computer to execute the functions of the data transmitting/receiving system of the present invention is stored.

The present invention also applies to an information aggregate which is a program and/or data for causing a computer to execute the functions of the data transmitting/receiving system of the present invention.

The data of the present invention includes a data configuration, a data format, and a type of data.

The medium of the present invention includes a recording medium such as an ROM, a transmission medium such as the Internet, and a transmission medium such as light, electric wave, and acoustic wave.

The storage medium of the present invention includes, for example, a recording medium on which the program and/or data is recorded, and a transmission medium for transmitting the program and/or data.

To be processed by a computer in the present invention indicates, for example, that the recording medium such as ROM is readable by a computer, and that the transmission medium can be dealt with the program and/or data to be transmitted as the result of the transmission.

The information aggregate of the present invention includes, for example, a software such as program and/or data.

Furthermore, as described in the above, the configuration of the present invention may be realized as software or as hardware.

INDUSTRIAL APPLICABILITY

The present invention relates to a transmitting/receiving system, and a transmission time measurement method for transmitting and receiving encrypted data, and is useful for the AV data transmission in a home network and the like.

The invention claimed is:
1. A communication method for controlling communication between a communication apparatus as a request source which transmits a request for transmission of content data and a communication apparatus as a request destination which responds to the request for transmission of content data, the method comprising steps of:
  sharing authentication information between the request destination and the request source so that the request destination and the request source store the authentication information, respectively;
  transmitting a measurement preparation request from the request destination to the request source, and generating, by the request destination, first pre-measurement information by using the authentication information stored in the request destination;
  upon receiving the measurement preparation request by the request source, transmitting a measurement preparation response from the request source to the request destination, and generating, by the request source, second pre-measurement information by using the authentication information stored in the request source;

after the steps of transmitting a measurement preparation request and transmitting a measurement preparation response, transmitting a measurement request from the request destination to the request source, the measurement request including first data created based on the first pre-measurement information, the first data being different from the first pre-measurement information;

upon receiving the measurement request by the request source, transmitting a measurement response from the request source to the request destination, the measurement response including second data created based on the second pre-measurement information, the second data being different from the second pre-measurement information;

measuring a period of time from the transmission of the measurement request to the reception of the measurement response, as a round trip time;

determining, by the request destination, whether the round trip time is less than or equal to a reference value;

upon determining that the round trip time is less than or equal to the reference value, determining, by the request destination, whether the second data received from the request source is valid based on the first pre-measurement information;

sending a verification request from the request destination to the request source, when the second data is valid;

upon receiving the verification request, determining, by the request source, whether the first data received from the request destination is valid based on the second pre-measurement information;

sending a verification result from the request source to the request destination, when the first data is valid;

upon receiving the verification result, determining, by the request destination, that the request source is an eligible device as a transmission destination of the content data; and upon determining that the request source is an eligible device as a transmission destination, registering, by the request destination, device identification information for identifying the request source in the request destination, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring the round trip time.

2. The communication method according to claim 1, wherein:

the content data is encrypted, and the method further comprises steps of:

before transmitting the measurement request to the request source, confirming, by the request destination, whether device identification information of the request source has been registered; and in the case where it is confirmed that the device identification information of the request source has been registered, exchanging a key used for decrypting the encrypted content data without measuring the round trip time.

3. The communication method according to claim 2, wherein:

the key is encrypted by using the authentication information which was previously used for generating the first pre-measurement information and the second pre-measurement information.

4. The communication method according to claim 1, wherein when the second data is equal to a predetermined portion of the first pre-measurement information, the second data is determined to be valid by the request destination, and when the first data is equal to a predetermined portion of the second pre-measurement information, the first data is determined to be valid by the request source.

5. A communication apparatus as a request destination configured to respond to a request for transmission of content data from a request source, the communication apparatus comprising:

a transmission time measurement processing unit including:

a measurement request transmitting unit configured to transmit, to the request source, a measurement request which includes first data created based on first pre-measurement information generated by using authentication information stored in the request destination, the first data being different from the first pre-measurement information;

a measurement response receiving unit configured to receive, from the request source, a measurement response which includes second data created based on second pre-measurement information, the second pre-measurement information being generated by using authentication information stored in the request source, the authentication information stored in the request source being the same as the authentication information stored in the communication apparatus, the second data being different from the second pre-measurement information;

a round trip time measurement unit configured to measure a period of time from the transmission of the measurement request to the reception of the measurement response, as a round trip time;

a determination unit configured to:

determine whether the round trip time is less than or equal to a reference value, upon determining that the round trip time is less than or equal to the reference value, determine whether the second data received from the request source is valid based on the first pre-measurement information, upon determining that the second data is valid, send a verification request to the request source to request whether or not the first data transmitted from the communication apparatus is valid based on the second pre-measurement information, in response to sending the verification request, receive a verification result, from the request source, verifying that the first data is valid, and upon receiving the verification result, determine that the request source is an eligible device as a transmission destination of the content data;

a measurement preparation request transmitting unit configured to transmit a measurement preparation request to the request source, before the measurement request transmitting unit transmits the measurement request; and a measurement preparation response receiving unit configured to receive a measurement preparation response from the request source, before the measurement request transmitting unit transmits the measurement request, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring the round trip time.

6. The communication apparatus according to claim 5, further comprising:

an authentication unit configured to share the authentication information with the request source; and a registration unit configured to, when the request source is determined as the eligible device, register device identification information for identifying the request source, wherein:

the measurement preparation request transmitting unit is configured to generate the first pre-measurement information.

7. The communication apparatus according to claim 6, wherein:

the content data is encrypted, and the communication apparatus further comprises:

a registration confirmation unit configured to confirm, before the measurement request transmitting unit transmits the measurement request to the request source, whether the device identification information of the request source has been registered; and a key exchange unit configured to exchange a key used for decrypting the encrypted content data, in the case where it is confirmed by the registration confirmation unit that the device identification information of the request source has been registered, the key exchange unit exchanges the key without the round trip time measurement unit measuring the round trip time.

8. The communication apparatus according to claim 7, wherein the key is encrypted by the authentication information which was previously used for generating the first pre-measurement information and the second pre-measurement information.

9. The communication apparatus according to claim 6, wherein the authentication information includes a flag and certification information for the flag, the flag specifying whether or not the request source has a function of measuring a round trip time, the apparatus further comprising:

a measurement function determination unit configured to determine whether or not the request source has the function of measuring a round trip time, based on the flag, the measurement preparation request transmitting unit is configured to transmit the measurement preparation request in the case where it is determined that the request source has the function of measuring a round trip time, and not to transmit the measurement preparation request in the case where it is determined that the request source does not have the function of measuring a round trip time.

10. The communication apparatus according to claim 6, further comprising:

a registration canceling unit configured to cancel registration of the device identification information when a registration effective period set in the device identification information expires.

11. The communication apparatus according to claim 10, further comprising:

a measurement start determination unit configured to determine whether or not measuring the round trip time is started, based on a remaining time until the registration of the device identification information is cancelled;

a measurement start request transmitting unit configured to transmit a measurement start request to the request source, in the case where the remaining time is less than or equal to a predetermined time; and a measurement start response receiving unit configured to receive, from the request source, a measurement start response as a response to the measurement start request, wherein the authentication unit is configured to share the authentication information with the request source, after the reception of the measurement start response from the request source.

12. The communication apparatus according to claim 6, further comprising:

a measurement start determination unit configured to determine whether or not measuring the round trip time is started;

a measurement start request transmitting unit configured to transmit, to the request source, a measurement start request which notifies a start of measuring the round trip time, in the case where the measurement of the round trip time is started; and a measurement start response receiving unit configured to receive, from the request source, a measurement start response as a response to the measurement start request, wherein the authentication unit is configured to share the authentication information with the request source, after the reception of the measurement start response from the request source.

13. The communication apparatus according to claim 6, further comprising:

a measurement start request receiving unit configured to receive, from the request source, a measurement start request for starting a measurement of the round trip time; and a measurement start response transmitting unit configured to transmit, to the request source, a measurement start response as a response to the measurement start request, wherein the authentication unit is configured to share the authentication information with the request source after the transmission of the measurement start response to the request source.

14. The communication apparatus according to claim 5, wherein:

the first data is a portion of the first pre-measurement information, and the second data is a portion of the second pre-measurement information, and the determination unit is configured to determine that the second data is valid when the second data is equal to a predetermined portion of the first pre-measurement information.

15. A communication apparatus configured to transmit a request for transmission of content data to a request destination, the request destination responding to the request for the transmission of the content data, the communication apparatus comprising:

a transmission time measurement processing unit including:

a measurement request receiving unit configured to receive, from the request destination, a measurement request which includes first data created based on first pre-measurement information generated by using authentication information stored in the request destination, the first data being different from the first pre-measurement information;

a measurement response transmitting unit configured to transmit, to the request destination, a measurement response which includes second data created based on the second pre-measurement information generated by using authentication information stored in the request source, the authentication information stored in the request source being the same as the authentication information stored in the request destination, the second data being different from the second pre-measurement information;

a determination unit configured to:
after transmitting the measurement response, receive a verification request, from the request destination,
upon receiving the verification request, determine whether or not the first data is valid based on the second pre-measurement information, and
upon determining that the first data is valid, send a verification result, to the request destination; and a measurement preparation request receiving unit configured to receive a measurement preparation request from the request destination, before the measurement request receiving unit receives the measurement request; and a measurement preparation response transmitting unit configured to transmit a measurement preparation response to the request destination, before the measurement request receiving unit receives the measurement request, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring the round trip time.

16. The communication apparatus according to claim 1, further comprising:
an authentication unit configured to share the authentication information with the request destination, wherein:
the measurement preparation request receiving unit is configured to generate the second pre-measurement information.

17. The communication apparatus according to claim 16, further comprising:
a measurement start determination unit configured to determine whether or not measuring the round trip time is started;
a measurement start request transmitting unit configured to transmit, to the request destination, a measurement start request for starting the measurement of the round trip time, in the case where the measurement of the round trip time is started; and
a measurement start response receiving unit configured to receive, from the request destination, a measurement start response as a response to the measurement start request,
wherein the authentication unit is configured to share the authentication information with the request destination, after the reception of the measurement start response from the request destination.

18. The communication apparatus according to claim 17, wherein:
the measurement start determination unit is configured to determine whether or not the content data has already been received, and
the measurement start request transmitting unit is configured to transmit the measurement start request to the request destination, in the case where the content data has already been received.

19. The communication apparatus according to claim 17, wherein:
the measurement start determination unit is configured to determine whether or not the round trip time has been measured during a period of time from when the authentication occurs to when the key exchange occurs, and
the measurement start request transmitting unit is configured to transmit the measurement start request to the request destination after the key exchange, in the case where the round trip time has not been measured.

20. The communication apparatus according to claim 16, wherein:
the content data is encrypted, and
the communication apparatus further comprises a key exchange unit configured to exchange a key used for decrypting the encrypted content data, and
in the case where the measurement request receiving unit has not received the measurement request after the communication apparatus requested for transmission of the content data, the key exchange unit exchanges the key without the measurement response transmitting unit transmitting the measurement response.

21. The communication apparatus according to claim 20, wherein:
the key is encrypted by the authentication information which was previously used for generating the first pre-measurement information and the second pre-measurement information.

22. The communication apparatus according to claim 15, wherein:
the first data is a portion of the first pre-measurement information, and the second data is a portion of the second pre-measurement information, and
a determination unit configured to determine the first data is valid when the first data is equal to a predetermined portion of the second pre-measurement information.

23. The communication apparatus according to claim 15, further comprising:
a measurement start request receiving unit configured to receive, from the request destination, a measurement start request which notifies to start measuring the round trip time; and
a measurement start response transmitting unit configured to transmit, to the request destination, a measurement start response as a response to the measurement start request,
wherein the authentication unit is configured to share the authentication information with the request destination after the transmission of the measurement start response to the request destination.

24. A non-transitory computer-readable recording medium on which a communication program for controlling a communication apparatus as a request destination which responds to a request for transmission of content data is recorded, said program, when executed, causing the communication apparatus to execute steps of:
transmitting a measurement preparation request to the request source;
receiving a measurement preparation response from the request source;
transmitting, to the request source, a measurement request which includes first data created based on first pre-measurement information, the first pre-measurement information being generated by using authentication information stored in the request destination, the first data being different from the first pre-measurement information;

in response to the transmitting a measurement request, receiving, from the request source, a measurement response which includes second data created based on second pre-measurement information, the second pre-measurement information being generated by using authentication information stored in the request source, the authentication information stored in the request source being the same as the authentication information stored in the request destination, the second data being different from the second pre-measurement information;

measuring a period of time from the transmission of the measurement request to the reception of the measurement response, as a round trip time;

determining whether the round trip time is less than or equal to a reference value;

upon determining that the round trip time is less than or equal to the reference value, determining whether the second data is valid based on the first pre-measurement information;

sending a verification request to the request source when the second data is valid;

in response to sending the verification request, receiving a verification result, from the request source, verifying that the first data transmitted to the request source is valid; and upon receiving the verification result, determining that the request source is an eligible device as a transmission destination of the content data, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring the round trip time.

25. A non-transitory computer-readable recording medium on which a communication program for controlling a communication apparatus as a request source which transmits a request for transmission of content data to a request destination is recorded, said program, when executed, causing the communication apparatus to execute steps of:

receiving a measurement preparation request from the request destination;

transmitting a measurement preparation response to the request destination;

receiving, from the request destination, a measurement request which includes first data created based on first pre-measurement information, the first pre-measurement information being generated by using authentication information stored in the request destination; the first data being different from the first pre-measurement information transmitting, to the request destination, a measurement response which includes second data created based on the second pre-measurement information, the second pre-measurement information being generated by using authentication information stored in the request source, the authentication information stored in the request source being the same as the authentication information stored in the request destination, the second data being different from the second pre-measurement information;

in response to transmitting the measurement response, receiving a verification request, from the request destination;

upon receiving the verification request, determining whether or not the first data transmitted from the request destination is valid based on the second pre-measurement information; and sending a verification result, to the request destination, when the first data is valid, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring a round trip time.

26. A communication method for controlling communication between a communication apparatus as a request source which transmits a request for transmission of content data and a communication apparatus as a request destination which responds to the request for transmission of content data, the method comprising steps of:

transmitting a measurement preparation request to the request source;

receiving a measurement preparation request by the request source;

transmitting a measurement preparation response to the request destination;

receiving a measurement preparation response by the request destination;

transmitting a measurement request from the request destination to the request source, the measurement request including first data created based on first pre-measurement information, the first pre-measurement information being generated by using authentication information stored in the request destination, the first data being different from the first pre-measurement information;

upon receiving the measurement request, transmitting a measurement response from the request source to the request destination, the measurement response including second data created based on second pre-measurement information, the second pre-measurement information being generated by using the authentication information stored in the request source, the second data being different from the second pre-measurement information;

measuring a period of time from the transmission of the measurement request to the reception of the measurement response, as a round trip time;

determining, by the request destination, whether the round trip time is less than or equal to a reference value;

after determining that the round trip time is less than or equal to the reference value, sending a verification request from the request destination to the request source;

upon receiving the verification request, determining, by the request source, whether the first data transmitted from the request destination is valid based on the second pre-measurement information;

sending a verification result from the request source to the request destination, when the first data is valid; and upon receiving the verification result, determining, by the request destination, that the request source is an eligible device as a transmission destination of the content data, wherein:

the first data is a portion of the first pre-measurement information, and is also a portion of the second pre-measurement information, and the second data is a portion of the second pre-measurement information, and is also a portion of the first pre-measurement information, and the measurement preparation request and the measurement preparation response are not used in measuring the round trip time.

27. The communication method according to claim 26, wherein:

the content data is encrypted, and the method further comprises steps of:

confirming, by the request destination, before transmitting the measurement request to the request source, whether device identification information of the request source has been registered; and in the case where it is confirmed that the device identification information of the request source has been registered, exchanging a key used for decrypting the encrypted content data without measuring the round trip time.

28. The communication method according to claim 27, wherein:

the key is encrypted by the authentication information which was previously used for generating the first pre-measurement information and the second pre-measurement information.

29. The communication method according to claim 26, wherein the first data is a portion of the first pre-measurement information, and the second data is a portion of the second pre-measurement information, when the second data is equal to a predetermined portion of the first pre-measurement information, the second data is determined as a valid data by the request destination.

30. The communication method according to claim 26, further comprising, after determining that the round trip time is less than or equal to the reference value and before sending a verification request from the request destination to the request source, a step of determining, by the request destination, whether the second data received from the request source is valid based on the first pre-measurement information, wherein the verification request is sent to the request source when it is determined that the second data is valid.

* * * * *